United States Patent [19]
Han et al.

[11] Patent Number: 6,128,041
[45] Date of Patent: Oct. 3, 2000

[54] METHOD AND APPARATUS FOR BINARY SHAPE ENCODING

[75] Inventors: Seok-Won Han; Jin-Hun Kim, both of Seoul, Rep. of Korea

[73] Assignee: Daewoo Electronics Co., Ltd., Rep. of Korea

[21] Appl. No.: 08/918,278

[22] Filed: Aug. 25, 1997

[30] Foreign Application Priority Data

Jul. 11, 1997 [KR] Rep. of Korea ...................... 97-32204

[51] Int. Cl.[7] ........................................................ H04N 7/46
[52] U.S. Cl. ........................ 348/398; 348/397; 348/420; 348/627; 348/608; 382/236
[58] Field of Search ................................. 348/625, 627, 348/397, 398, 399, 408, 420, 393, 607, 608; 382/237, 236, 299, 242, 243, 232; H04N 7/46

[56] References Cited

U.S. PATENT DOCUMENTS

| | | | |
|---|---|---|---|
| 5,465,119 | 11/1995 | Demos | 348/447 |
| 5,629,737 | 5/1997 | Menez et al. | 348/398 |
| 5,633,685 | 5/1997 | Cho et al. | 348/420 |
| 5,635,986 | 6/1997 | Kim | 348/416 |
| 5,675,669 | 10/1997 | Kim | 382/241 |
| 5,737,449 | 4/1998 | Lee | 382/242 |
| 5,774,595 | 6/1998 | Kim | 382/241 |
| 5,774,596 | 6/1998 | Kim | 382/242 |
| 5,793,893 | 8/1998 | Kim | 382/242 |
| 5,805,736 | 9/1998 | Kim | 382/242 |
| 5,808,683 | 9/1998 | Tong et al. | 348/398 |
| 5,822,460 | 10/1998 | Kim | 382/243 |
| 5,838,830 | 11/1998 | Qian et al. | 382/243 |
| 5,870,501 | 2/1999 | Kim | 382/241 |
| 5,881,175 | 3/1999 | Kim | 382/242 |
| 5,883,977 | 3/1999 | Kim | 382/242 |
| 5,886,743 | 3/1999 | Oh et al. | 348/407 |
| 5,896,466 | 4/1999 | Kim | 382/242 |
| 5,896,467 | 4/1999 | Kim | 382/242 |
| 5,926,791 | 7/1999 | Ogata et al. | 704/500 |
| 5,929,912 | 7/1999 | Aono et al. | 348/398 |
| 5,929,913 | 7/1999 | Etoh | 348/398 |
| 5,929,917 | 7/1999 | Kim | 348/420 |

FOREIGN PATENT DOCUMENTS 9728507 8/1997 WIPO .

OTHER PUBLICATIONS

Paulo Correia et al., "Video Analysis and Coding for the emerging MPEG4 Standard", URL:http://amalia.img.1x.it.pt/~fp/artigo58.htm.

Convener of WG 11 (MPEG), "Description of MPEG–4", MPEG 96 (Oct. 1996/Chicago), URL:http://www.crs4.it/~luigi/MPEG/mpeg4.html#What is MPEG–4.

*Primary Examiner*—Michael H. Lee
*Assistant Examiner*—Jean W. Désir
*Attorney, Agent, or Firm*—Anderson Kill & Olick

[57] ABSTRACT

A binary shape encoding apparatus encodes a binary alpha block (BAB) consisting of M×N binary pixels, M and N each being a positive even integer. The apparatus samples every other horizontal lines of the BAB to generate a first block starting from either a first or a second horizontal line of the BAB and then samples every other vertical lines of the first block to generate a first sample block as a base layer also starting from either a first or a second vertical line of the first block, wherein the first horizontal and vertical lines are the topmost horizontal and the leftmost vertical lines in the BAB and the first block, respectively. Then, the apparatus encodes the first sample block to thereby produce coded base layer data and performs enhancement layer encoding based on the BAB, the first block and the first sample block to thereby provide coded horizontal and vertical enhancement layer data.

19 Claims, 10 Drawing Sheets

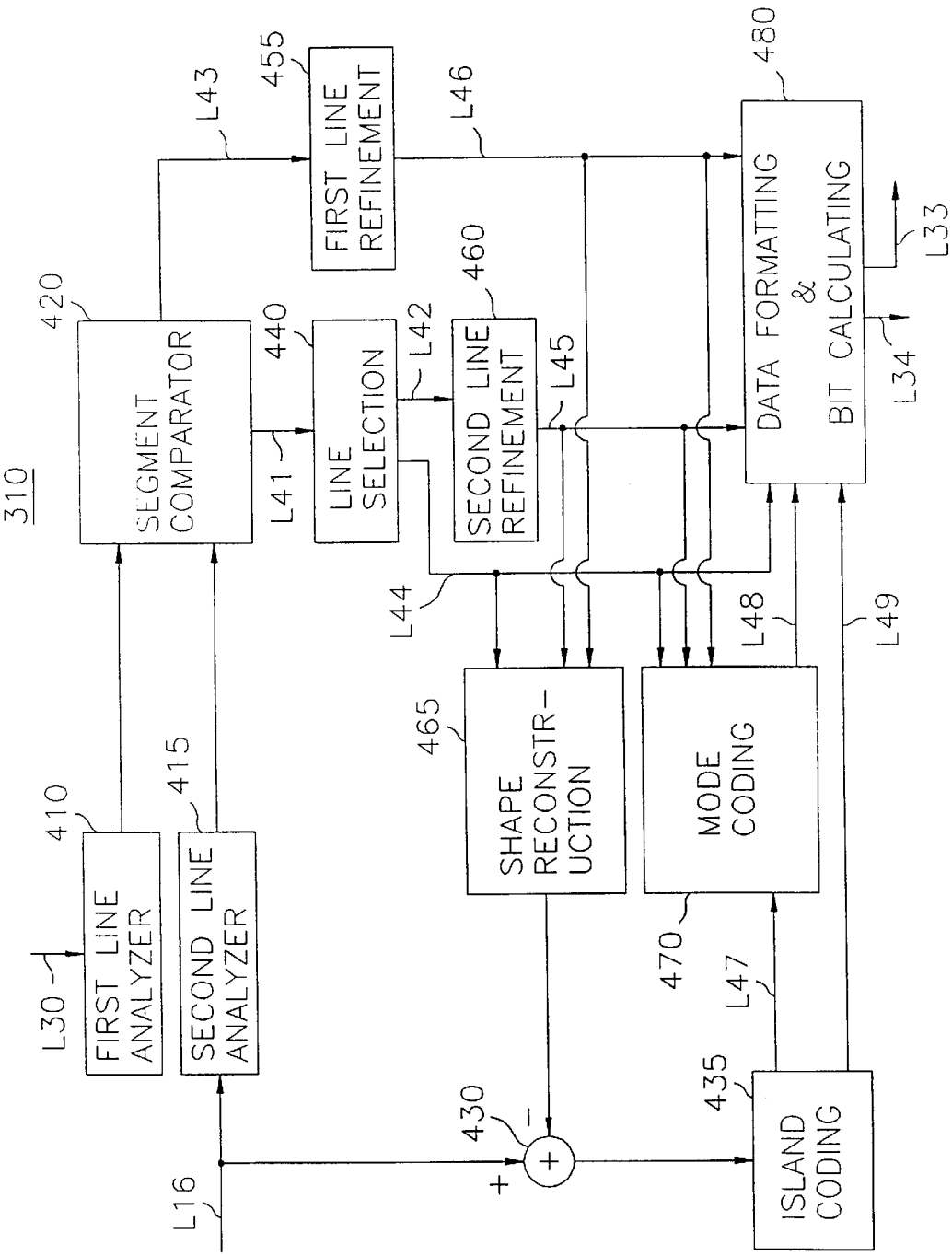

501

503

505

511

512

513

METHOD AND APPARATUS FOR BINARY SHAPE ENCODING

FIELD OF THE INVENTION

The present invention relates to a binary shape encoding method and apparatus; and, more particularly, to a binary shape encoding method and apparatus implementing scalability which may enhance image resolution.

DESCRIPTION OF THE PRIOR ART

In digital video systems such as video-telephone and teleconference systems, a large amount of digital data is needed to define each video frame signal since the video frame signal comprises a sequence of digital data referred to as pixel values.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects; and three sets of parameters for defining the motion, contour and pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and area surveillance.

According to MPEG-4, an input video image is divided into a plurality of video object planes(VOP's), which correspond to entities in a bitstream that a user can access and manipulate. A VOP can be referred to as an object and represented by a bounding rectangle whose width and height may be the smallest multiples of 16 pixels(a macroblock size) surrounding each object so that the encoder may process the input video image on a VOP-by-VOP basis, i.e., an object-by-object basis.

A VOP described in MPEG-4 includes shape information and color information consisting of luminance and chrominance data, wherein the shape information is represented by, e.g., a binary mask and related to the luminance data. In the binary mask, one binary value, e.g., 0, is used to designate a pixel located outside the object in the VOP and the other binary value, e.g., 1, is used to indicate a pixel inside the object. Binary shape information, representing the location and shape of the objects, can be expressed as a binary alpha block(BAB), which is encoded by using a bit-map-based shape coding method known conventionally.

For instance, if a bit-map-based shape coding method such as a context-based arithmetic coding(CAE) method is used, coded binary shape information representing the location and shape of the objects is obtained in an intra mode while encoded error data and motion vector information representing the difference between a binary shape signal within a current frame(or VOP) and its most similar binary shape signal within a previous frame(or VOP) is found by motion estimation and compensation.

However, the coded binary shape information obtained such as above is decoded at a decoder into a reconstructed image which has only a preset resolution. Therefore, if an image with a higher resolution is desired, the binary shape information is conventionally coded with scalability implemented therein which gradually increases resolution of the decoded image. That is, a base layer representing an image with a lower resolution is coded; and based on the base layer, additional information is added to generate an enhancement layer, which is, then, coded.

Referring to FIG. 1, there is shown a conventional apparatus 100 for binary shape signal encoding in accordance with a bit-map-based coding method, which comprises a sub-sampling circuit 110, a base layer coding circuit 120, an enhancement layer coding circuit 130 and a multiplexer (MUX) 140. The enhancement layer coding circuit 130 includes an enhancement layer reconstruction circuit 131, a subtractor 133 and an island coding circuit 135.

A binary alpha block(BAB) comprising binary pixels representing objects and backgrounds within a frame or VOP, for example, a block of 16×16 binary pixels, is inputted to the sub-sampling circuit 110 and to the subtractor 133 of the enhancement layer coding circuit 130 via a line L1. The sub-sampling circuit 110 samples the inputted BAB of 16×16 pixels to thereby provide a sample block of 8×8 pixels via a line L2 to the base layer coding circuit 120 and the enhancement layer reconstruction block 131. The method used for sampling in the sub-sampling circuit 110, first of all, divides the BAB of 16×16 pixels into block of 2×2 pixels. Then, for each 2×2 block, a binary value shared by most of the pixels within each 2×2 block is selected. In case there are same number of two binary values within a 2×2 block, a binary value is selected according to a predetermined rule. Subsequently, all the selected binary values are collected sequentially to construct a sample block of 8×8 pixels.

The base layer coding circuit 120 encodes the sample block inputted thereto by using a conventional encoding method, for example, a bit-map-based shape encoding technique to thereby supply coded base layer data to the MUX 140 via a line L3.

The enhancement layer reconstruction circuit 131 reconstructs an enhancement layer based on the sample block in accordance with a predetermined reconstruction method to thereby couple a reconstructed enhancement layer to the subtractor 133 via a line L5. Also, the enhancement layer reconstruction circuit 131 encodes the reconstructed enhancement layer to thereby deliver coded enhancement layer data to the MUX 140 via another line L4. In the predetermined reconstruction method, a block of 2×2 pixels, comprising four binary pixels, is reconstructed for each binary pixel within the sample block, wherein all the four pixels in the reconstructed block have the same binary value as the pixel in the sample block. Then, the blocks of 2×2 pixels are assembled sequentially to construct a BAB of 16×16 pixels, which is subsequently provided as the enhancement layer. The reconstruction method employed at the enhancement layer coding circuit 130 is also known to the decoder, which reconstructs the enhancement layer accordingly.

The subtractor 133 subtracts the reconstructed enhancement layer coupled thereto via L5 from the BAB inputted thereto via L1 to supply an error data block of 16×16 pixels to the island coding circuit 135. The error data block includes pixels of first and second binary values, e.g., 1 and 0, respectively, wherein the first binary values represent the pixels for which the results of the substraction between the BAB and the reconstructed enhancement layer block are not zero, and the second binary values represent identical pixels for which the substraction between the BAB and the reconstructed enhancement layer block result in zero.

The island coding circuit 135 island-codes the error data block by using, for example, a reference contour based (RCB) coding method to thereby couple island-coded data to the MUX 140 via a line L6.

The MUX 140 multiplexes the coded base layer data on L3, the coded enhancement layer data on L4, and the island-coded data on L6 to provide its output to a transmitter to be transmitted to a decoder therefrom.

The transmitted data implemented with scalability such as above can be decoded in many ways at a decoder. One way is that only the coded lower layer, for example, the coded base layer, is decoded to acquire an image with a lower resolution. However, to enhance the resolution of the image, the base layer and a few of its upper layers can be decoded. To enhance the resolution still further, all the layers transmitted can be decoded, achieving an image with a same resolution as the original image, assuming that a lower layer is decoded prior to its higher layers even though the higher layers may not be decoded. The encoding and decoding method implemented with scalability, such as described herein, can not only reduce error, but also prevent loss of bits, thereby achieving a transmission of images with excessively high resolutions.

However, in the conventional enhancement layer coding method and apparatus, correlations between the binary pixels consecutive to each other have not been fully exploited, and thus resulting in a great deal of errors between the reconstructed enhancement layer obtained from the BAB and the BAB itself. As a result, considerable amount of bits are required for transmission of the island-coded data. In addition to this, according to the conventional method and apparatus, in an inter mode, the contingency between a current and a previous VOP's, which can be employed in increasing the coding efficiency, has been ignored. Therefore, there are limitations in effectively coding an enhancement layer in conventional coding method and apparatus.

SUMMARY OF THE INVENTION

It is, therefore, a primary object of the invention to provide a binary shape encoding method and apparatus employing scalability to enhance resolution of a decoded image gradually.

In accordance with the present invention, there is provided a method for encoding a binary alpha block(BAB) consisting of M×N binary pixels included in a video signal, M and N each being a positive even integer, comprising the steps of: sampling every other horizontal lines of the BAB to generate a first block starting from either a first or second horizontal line of the BAB, wherein the first horizontal line is the topmost horizontal line of the BAB; sampling every other vertical lines of the first block to generate a first sample block as a base layer starting from either a first or second vertical line of the first block, wherein the first vertical line is the leftmost vertical line in the first block; encoding the first sample block to thereby produce coded base layer data; and enhancement layer encoding based on the BAB, the first block and the first sample block to thereby provide coded horizontal and vertical enhancement layer data.

BRIEF DESCRIPTION OF THE DRAWINGS

The above and other objects and features of the present invention will become apparent from the following description of preferred embodiments given in conjunction with the accompanying drawings, in which:

FIG. 4 is a detailed block diagram of a first enhancement bit calculator of FIG. 3;

DETAILED DESCRIPTION OF THE PREFERRED EMBODIMENTS

In accordance with the present invention, a binary shape encoding method and apparatus employing scalability is provided. By employing scalability, an image with a high resolution, e.g., an enhancement layer, is encoded simultaneously as an image with a lower resolution, e.g., a base layer, wherein the former is encoded based on the latter.

Figure 1:
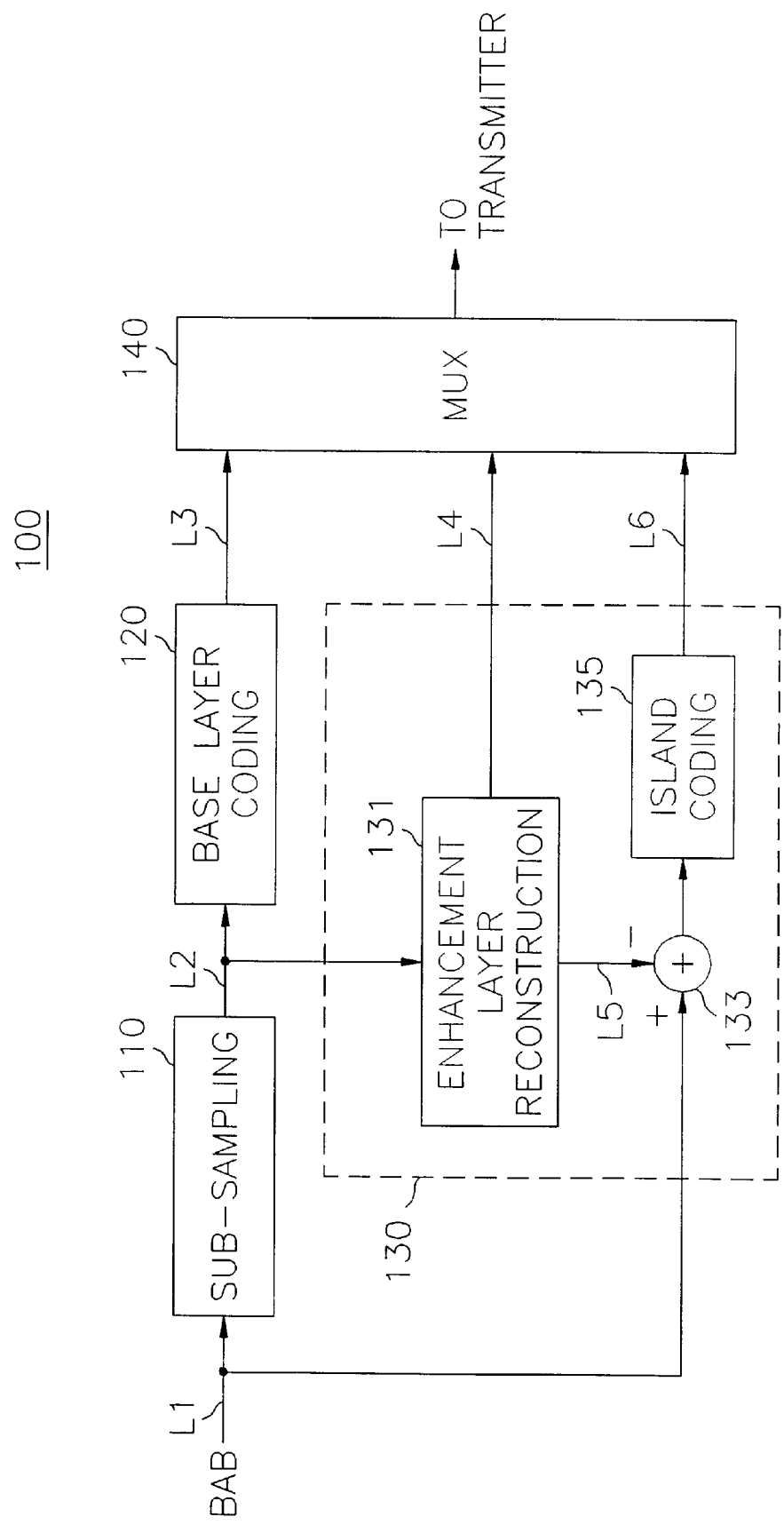
FIG. 1 illustrates a conventional apparatus for binary shape encoding.
Figure 2:
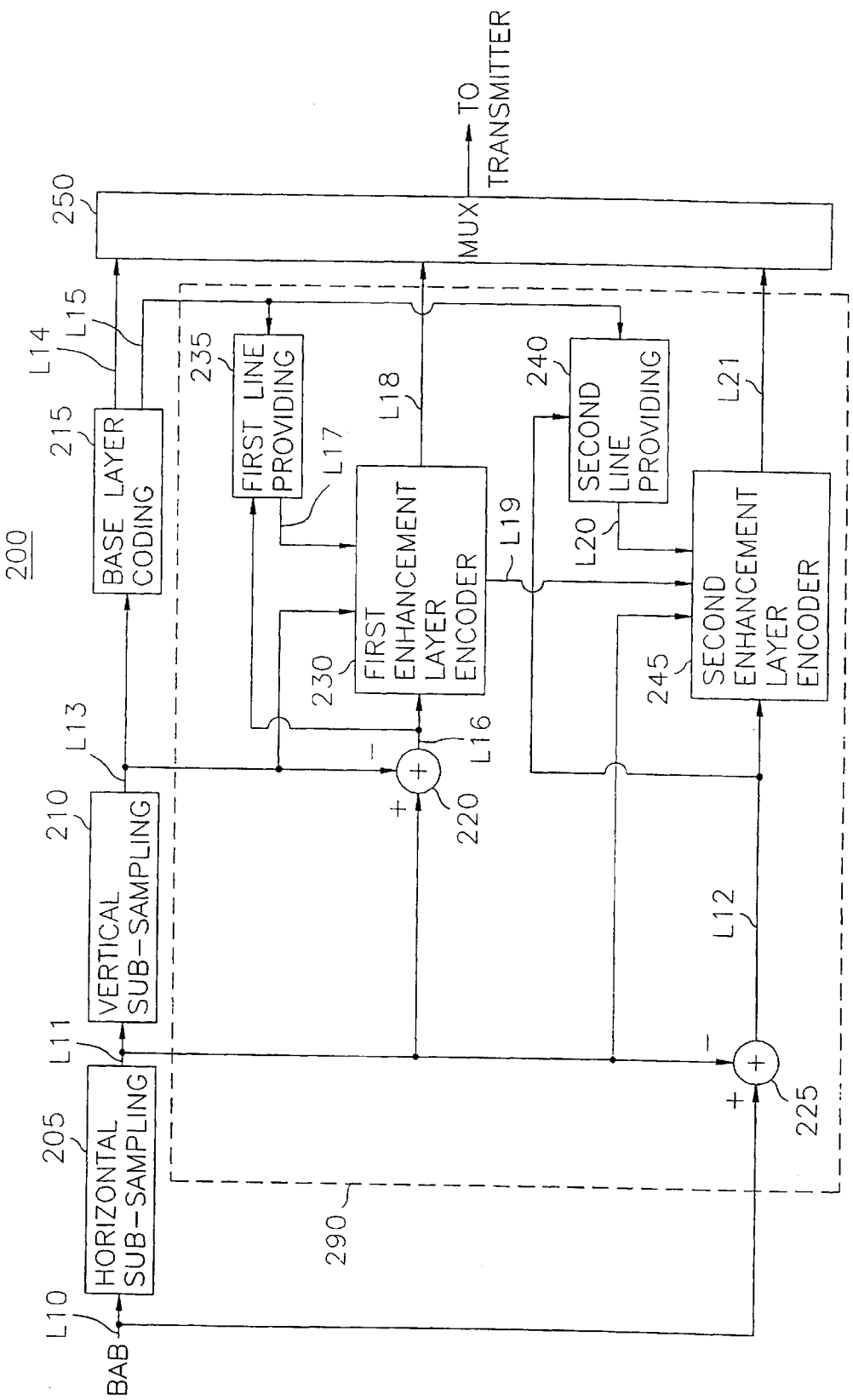
FIG. 2 shows an apparatus for binary shape encoding in accordance with the present invention.

Referring to FIG. 2, an encoder 200 for encoding binary shape encoding in accordance with the present invention is illustrated. The encoder 200 comprises a horizontal sub-sampling circuit 205, a vertical sub-sampling circuit 210, a base layer coding circuit 215, an enhancement layer coding circuit 290 and a multiplexer 250, wherein the enhancement layer coding circuit 290 includes subtractors 220 and 225, a first and a second enhancement layer encoders 230 and 245, and a first and a second line providing circuits 235 and 240. Binary shape information such as an image frame or a video object plane (VOP) comprising a plurality of binary alpha blocks of M×N binary pixels, M and N being a positive even integer, representing objects and backgrounds within the frame or VOP, is inputted to the horizontal sub-sampling circuit 205 and the subtractor 225 via a line L10 in units of the binary alpha blocks. For simplicity, both M and N are set to be 16. A binary alpha block (BAB) 501 of 16×16 pixels is exemplified in FIG. 5A, wherein the hatched and white areas represent object and background pixels, respectively.

The horizontal sub-sampling circuit 205 samples every other horizontal lines of a BAB to generate a first block starting from either a first or second horizontal line of the BAB, wherein the first horizontal line is the topmost horizontal line of the BAB. For simplicity, it is assumed here that the horizontal sub-sampling circuit 205 samples eight consecutive even-numbered horizontal lines of a BAB inputted thereto to thereby provide a first block of 8×16 pixels to the vertical sub-sampling circuit 210, the subtractor 220, the second enhancement layer encoder 245, and the subtractor 225 via a line L11. A first block 503 of 8×16 pixels is depicted in FIG. 5B, wherein the hatched and white areas are object and background pixels, respectively. The same is also applied to FIGS. 5C to 5E.

The vertical sub-sampling circuit 210 samples every other vertical lines of the first block to generate a first sample block as a base layer starting from either a first or second vertical line of the first block, wherein the first vertical line is the leftmost vertical line in the first block. For simplicity, it is assumed here that the vertical sub-sampling circuit 210 samples eight consecutive even-numbered vertical lines of the first block inputted thereto to thereby provide a first sample block of 8×8 pixels as a base layer to the base layer coding circuit 215, the subtractor 220, and the first enhancement layer encoder 230 via a line L13. FIG. 5C shows an exemplary first sample block 505, transferred via the line L13, of 8×8 pixels.

In case of an intra mode, the base layer coding circuit 215 encodes the base layer, that is, the first sample block, inputted thereto by using a conventional encoding method, for example, a bit-map-based shape encoding technique to thereby supply coded base layer data to the MUX 250. In contrast to this, in case of an inter mode, a motion estimation and compensation circuit(not illustrated) implemented within the base layer coding circuit 215 compares the first sample block of the current frame with corresponding blocks of previous frames stored within a first frame memory(not illustrated) included in the base layer coding circuit 215. As a result, a first sample block of a previous frame which is most similar to the first sample block of the current frame is selected as an estimated first sample block.

Then, motion vector information, expressed by a two-dimensional vector having a horizontal and a vertical components, is obtained, wherein the motion vector information represents a displacement between the first sample block of the current frame and the estimated first sample block of the previous frame. The difference between the first sample block of the current frame and the estimated first sample block of the previous frame is encoded, thereby producing encoded error data. The motion vector information and the encoded error data are combined into coded base layer data to be supplied to the MUX 250.

A base layer reconstruction unit (not illustrated) reconstructs the first sample block of the current frame based on the encoded error data and the estimated first sample block. Then, the reconstructed first sample block is stored at a location reserved for that purpose within the first frame memory to be used in motion estimation and compensation of a following frame. And simultaneously, the motion vector information is provided to the first and the second line providing circuits 235 and 240 in the enhancement layer coding circuit 290.

In case of the intra mode, the enhancement layer coding circuit 290 carries out enhancement layer coding based on the BAB, the first block and the first sample block provided thereto via lines L10, L11 and L13, respectively, to thereby supply coded vertical and horizontal enhancement layer data via lines L18 and L21, respectively, to the MUX 250.

In contrast to this, in case of the inter mode, the enhancement layer coding circuit 290 carries out enhancement layer coding based not only on the BAB, the first block and the first sample block provided thereto via the lines L10, L11 and L13, respectively, but also on the motion vector information supplied thereto via a line L15 to thereby supply coded vertical and horizontal enhancement layer data via lines L18 and L21, respectively, to the MUX 250. The operation of the enhancement layer coding circuit 290 is described in more detail in the following.

The subtractor 220 subtracts the first sample block on the line L13 from the first block on the line L11 to thereby generate a second sample block and provides the second sample block, via a line L16, to the first enhancement layer encoder 230 and the first line providing circuit 235. The second sample block is composed of 8 odd-numbered vertical lines of the first block. Meanwhile, the subtractor 225, similarly, subtracts the first block on the line L11 from the BAB on the line L10 to thereby generate a second block and provides the second block, via a line L12, to second enhancement layer encoder 245 and the second line providing circuit 240. The second block of 8×16 pixels includes 8 odd-numbered horizontal lines of the binary alpha block of 16×16 pixels.

In case of the intra mode, the first line providing circuit 235 stores only the second sample block of 8×8 pixels at a corresponding location within a second frame memory therein (not illustrated). In case of the inter mode, in addition to storing the second sample block, the first line providing circuit 235 retrieves, based on the motion vector information inputted thereto via the line L15, a first retrieved block satisfying a first predetermined criterion among the second sample blocks of 8×8 pixels within the previous frame stored in the second frame memory. The first predetermined criterion is such that a horizontal and a vertical distances between the second sample block of 8×8 pixels on the line L16 and the first retrieved block are as long as the horizontal and the vertical components of the motion vector, respectively. The first retrieved block is, then, supplied to the first enhancement layer encoder 230 as a set of vertical inserted lines via a line L17.

In case of the intra mode, the second line providing circuit 240 stores only the second block of 8×16 pixels at a corresponding location within a third frame memory therein (not illustrated). In case of the inter mode, in addition to storing the second block, the second line providing circuit 240 retrieves, based on the motion vector information inputted thereto via the line L15, a second retrieved block satisfying a second predetermined criterion among the second blocks of 8×16 pixels within the previous frame stored in the third frame memory. The predetermined criterion is such that a horizontal and a vertical distances between the second block of 8×16 pixels on the line L12 and the second retrieved block are two times the horizontal component and one time the vertical component of the motion vector, respectively. The retrieved second block is supplied to the second enhancement layer encoder 245 as a set of horizontal inserted lines via a line L20.

In accordance with a preferred embodiment of the present invention, in case of the intra mode, the first enhancement layer encoder 230 carries out vertical enhancement layer encoding based on the first and second sample blocks provided thereto via the lines L13 and L16, respectively, to thereby supply coded vertical enhancement layer data to the MUX 250. And in case of the inter mode, the first enhancement layer encoder 230 carries out vertical enhancement layer encoding based not only on the first and the second sample blocks provided thereto via the lines L13 and L16, respectively, but also on the set of vertical inserted lines supplied thereto via the line L17, to thereby supply coded vertical enhancement layer data via the line L18 to the MUX 250.

In accordance with the above preferred embodiment of the present invention, in case of the intra mode, the second enhancement layer encoder 245 performs horizontal enhancement layer encoding based on the first and the second blocks inputted thereto via the lines L11 and L12, respectively, to thereby supply coded horizontal enhancement layer data to the MUX 250. And in case of the inter mode, the second enhancement layer encoder 245 performs horizontal enhancement layer encoding based not only on the first and the second blocks but also on the set of the horizontal inserted lines supplied thereto via the line L20 to thereby supply coded horizontal enhancement layer data to the MUX 250.

The MUX 250 multiplexes and provides the coded base layer data on the line L14, and the coded horizontal and vertical enhancement layer data on the lines L18 and L21, respectively, to a transmitter (not illustrated) to be transmitted to a decoder (also not illustrated).

Figure 3:
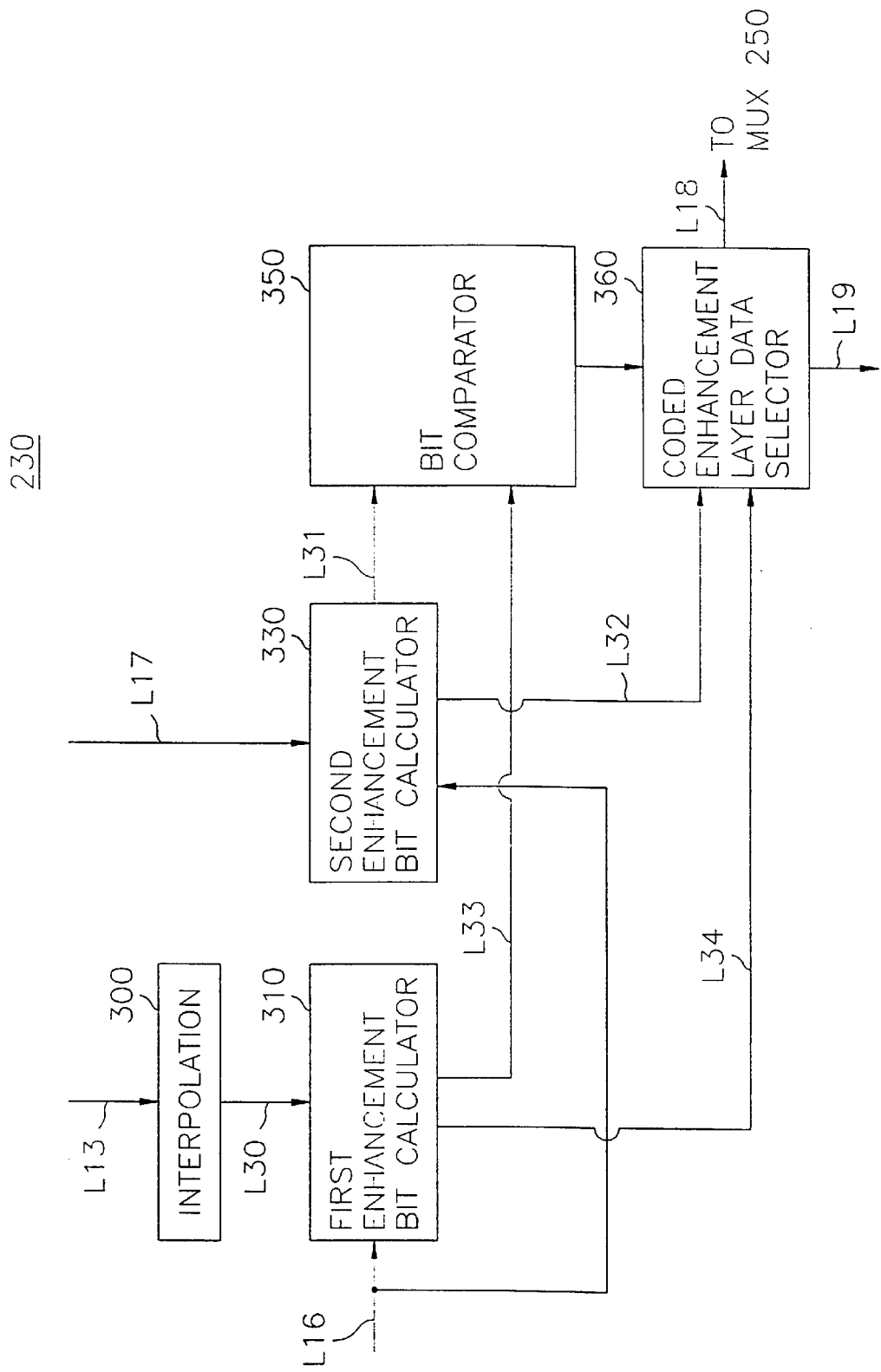
FIG. 3 presents a detailed block diagram of a first enhancement layer encoder of FIG. 2.

Hereinafter, the functions of the first enhancement layer encoder 230 are described further referring to its detailed block diagram shown in FIG. 3.

The first enhancement layer encoder 230 includes an interpolation circuit 300, a first and a second enhancement bit calculators 310 and 330, a bit comparator 350, and a coded enhancement layer data selector 360. The interpolation circuit 300 constructs a set of vertical interpolation lines, e.g., a set of vertical interpolation lines 509 as exemplified in FIG. 7B according to a predetermined vertical interpolation rule or method by using a set of vertical lines, e.g., a set of vertical lines 507 in FIG. 7A obtained from a block of 8×8 pixels, e.g., the first sample block 505 of FIG. 5C. The set of vertical interpolation lines are coupled to the first enhancement bit calculator 310 via a line L30.

The predetermined vertical interpolation method for constructing the set of vertical interpolation lines is also known at the decoder. Thus, the decoder generates a decoded base layer from the coded base layer inputted thereto. Then, based on the decoded base layer, the decoder produces a set of vertical interpolation lines, identical to the set of vertical interpolation lines constructed at the interpolation circuit 300, according to the predetermined interpolation method. The predetermined vertical interpolation method may be implemented differently in accordance with preferred embodiments of the invention. The vertical interpolation method used in the preferred embodiment given herein is described further in reference to FIGS. 5A to 5F, 6A to 6D, 7A and 7B.

In accordance with a predetermined vertical interpolation method of the present invention, a sample block, i.e., a first sample block of 8×8 pixels is up-sampled to an interpolation block having the same size as the subblock through vertical interpolation process.

Figure 5A:
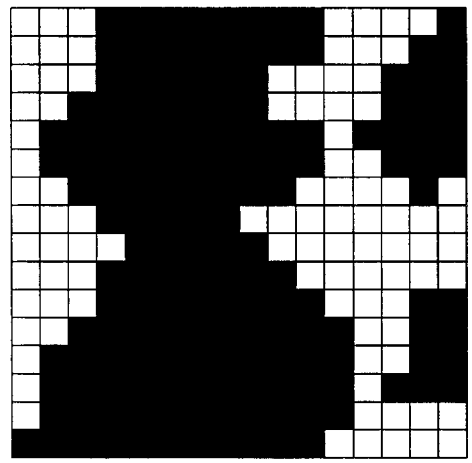
FIGS. 5A to 5E exemplifies a binary alpha block and sample blocks processed by the apparatus for binary shape encoding in accordance with the present.
Figure 5B:
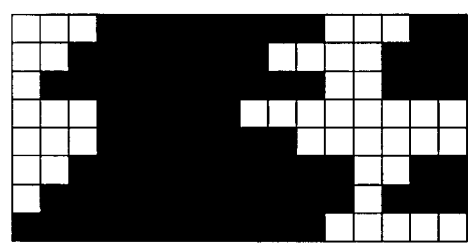
Figure 5C:
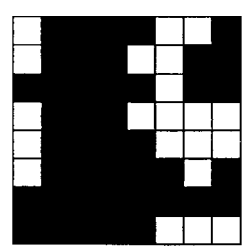

Referring to FIGS. 5A and 5C, there are shown a subblock and a corresponding sample block produced in the sampling process, respectively. The subblock, i.e., the binary alpha block 501 of 16×16 pixels in FIG. 5A is downsized to a sample block, i.e., the first sample block 505 of 8×8 pixels in FIG. 5C by the use of the sampling processes carried out at the horizontal sub-sampling circuit 205 and the vertical sub-sampling circuit 210.

In FIGS. 6A to 6D, 7A and 7B, the hatched parts represent object pixels constituting objects and white parts indicate background pixels.

In the above vertical interpolation process, in order to produce the interpolation block, the sample block is first vertically divided into a plurality of reference lines, i.e., vertical lines of the first sample block. Then, segments and non-segments on each of the reference lines are detected, wherein each segment is represented by one or more successive object pixels and each non-segment is defined by one or more successive background pixels. Based on the segments on the reference lines, interpolation lines, i.e., vertical interpolation lines are generated to constitute the interpolation block together with the reference lines.

Referring to FIGS. 6A to 6D, there are illustrated predetermined rules for producing corresponding interpolation lines based on the reference lines. In accordance with the present invention, one interpolation line is produced based on two neighboring reference lines.

Figure 6A:
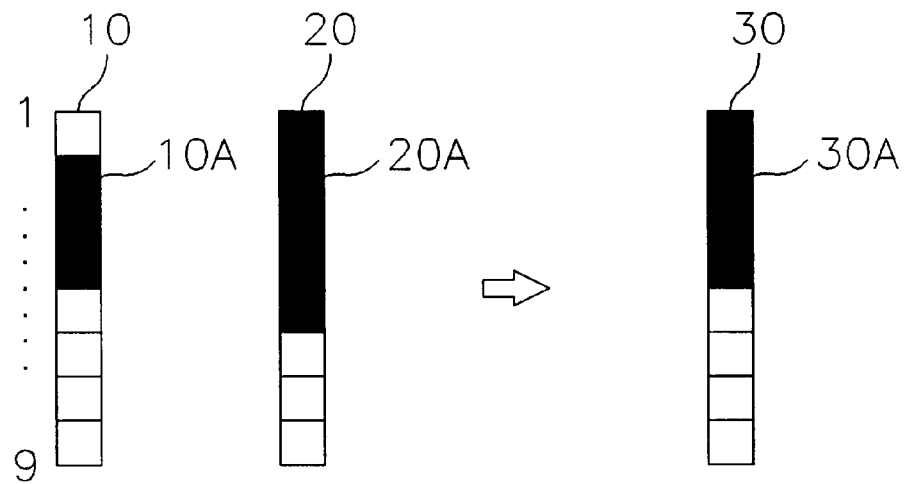
FIGS. 6A to 6D gives illustrative diagrams for explaining a vertical interpolation method used by the present invention.
Figure 6B:
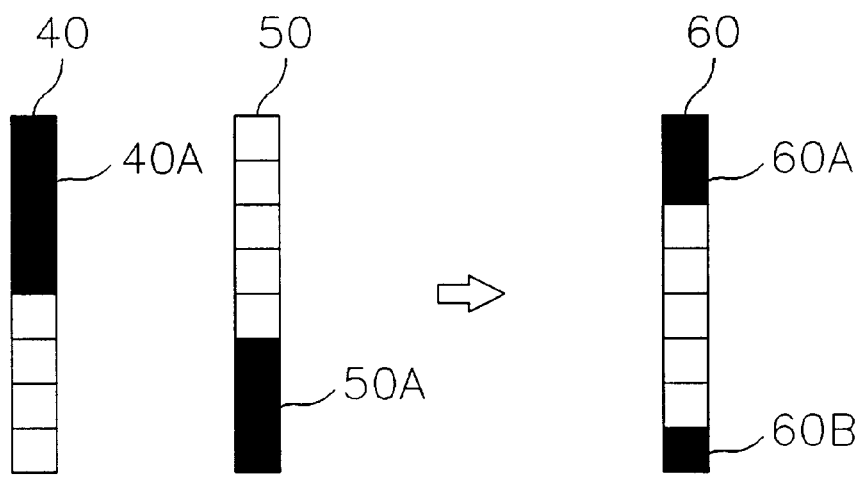
Figure 6C:
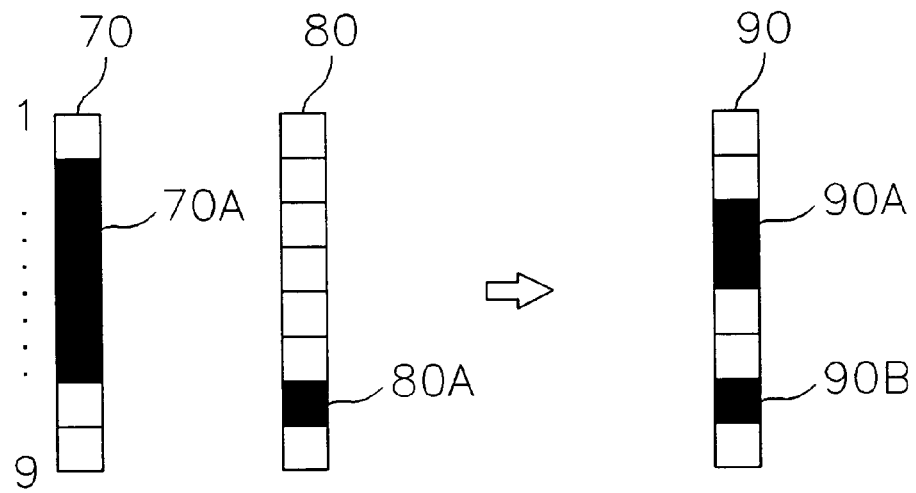

In FIGS. 6A to 6C, there are described three cases in which two reference lines have same number of segments.

As shown in FIG. 6A, if there are overlapping segments 10A and 20A on two neighboring reference lines 10 and 20, a segment 30A on an interpolation line 30 resulted from the reference lines 10 and 20 is determined based on positions of starting and ending points of the overlapping segments 10A and 20A. Therefore, the starting point of the segment 30A is calculated by averaging the respective starting points 2 and 1 of the segments 10A and 20A and truncating the average value 1.5 to 1. Likewise, the ending point of the segment 30A is determined as 5 obtained by truncating the average value of the ending points 5 and 6 of the segments 10A and 20A. In the above, the overlapping segments 10A and 20A overlap when the reference lines 10 and 20 are overlapped on top of each other. The overlap of the reference lines 10 and 20 is accomplished by comparing object pixel positions contained in segments on the reference lines 10 and 20.

Meanwhile, if there are non-overlapping segments 40A and 50A on the reference lines 40 and 50 and each of the non-overlapping segments 40A and 50A has a pixel located on a first or a last pixel position of the corresponding reference line as shown in FIG. 6B, wherein the non-overlapping segments 40A and 50A represent segments which do not overlap when the reference lines 40 and 50 are overlapped on top of each other, segments 60A and 60B on an interpolation line 60 are generated based on the number of pixels within the non-overlapping segments 40A and 50A, respectively. That is, the segment 60A has 2 object pixels which is a half of the number of object pixels on the non-overlapping segment 40A and starts from the first pixel position of the interpolation line 60. And the segment 60B contains one object pixel located on the last pixel position of the interpolation line 60 which is determined by dividing the number of object pixels on the non-overlapping segment 50A by 2 and truncating the division result.

Third, if there exist non-overlapping segments 70A and 80A on the reference lines 70 and 80 and they are positioned next to each other as shown in FIG. 6C, segments 90A and 90B on an interpolation line 90 are determined based on starting and ending points of the non-overlapping segments 70A and 80A, respectively. Starting and ending points of each of the segments 90A and 90B are calculated as follows:

$$SP \approx (3 \times P + 1 \times Q)/4, EP \approx (1 \times P + 3 \times Q)/4$$

wherein SP and EP represent a starting and an ending points of a segment on the interpolation line, respectively; P and Q are a starting and an ending points of a segment on a reference line corresponding to the interpolation line, respectively; and, if a calculated value of the right part is not an integer, the SP or EP is obtained by truncating the calculated value.

Figure 6D:
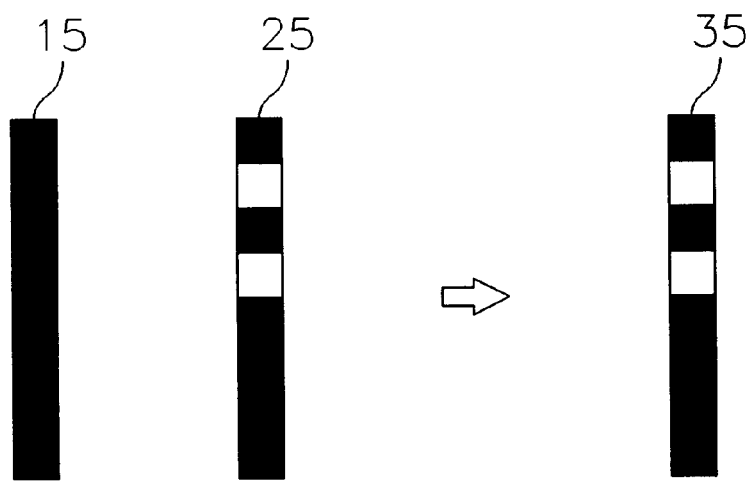

In contrast to this, in FIG. 6D, there is shown a case in which two reference lines have different number of segments. That is, a first reference line 15 consists of one segment and a second reference line 25 has 3 segments. In this case, an interpolation line 35 is constructed by AND-operating on both of the reference lines 15 and 25. Therefore, the interpolation line 35 contains object pixels which are commonly included in segments of the reference lines 15 and 25. In FIG. 6D, the interpolation line 35 has the same pixel pattern as the reference line 25 since all of the pixels on the reference line 15 are object pixels.

The predetermined rules explained with reference to FIGS. 6A to 6D can be applied to both of the vertical and the horizontal interpolation processes. Hereinafter, it will be described how the predetermined rules are practically adopted in the vertical interpolation process. And, a procedure of up-sampling the sample block will be introduced in detail.

Figure 7A:
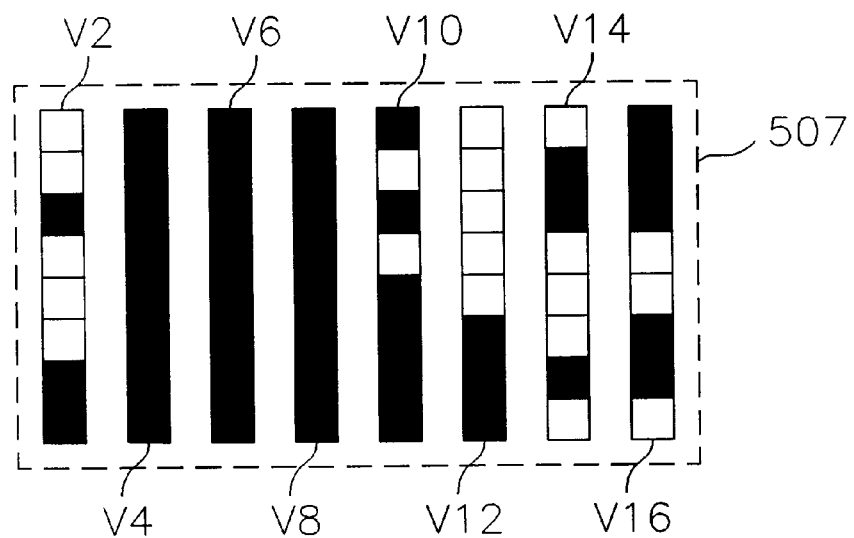
FIG. 7A yields an example of a set of vertical lines which are induced by the interpolation method employed by the present invention.
Figure 7B:
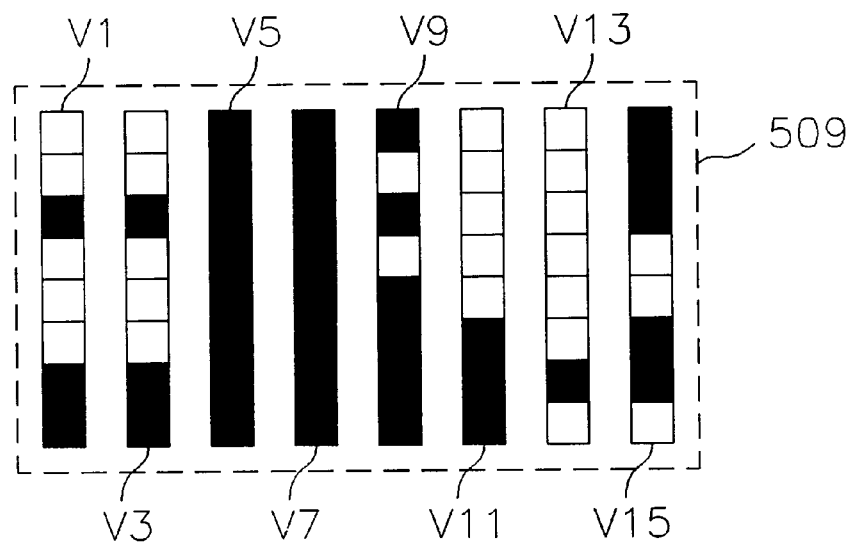
FIG. 7B renders an instance of a set of vertical interpolation lines generated by the interpolation method.

First of all, referring to FIGS. 7A and 7B, there is illustrated a vertical interpolation process in accordance with the first embodiment. The sample block 505 in FIG. 5C is first separated into 8 of vertical reference lines or vertical lines having assigned indices V2, V4, . . . , V16 for each line as shown in FIG. 7A, each vertical reference line containing vertically connected 8 number of pixels. Once the vertical reference lines V2 to V16 are determined, the number of segments on each of the vertical reference lines V2 to V16 is detected as 2, 1, 1, 1, 3, 1, 2, 2, starting from a leftmost vertical reference line V2. As comparing the number of segments for each of the vertical reference lines with that for its neighboring vertical reference line, vertical interpolation lines, e.g., V1, V3, . . . , V15 in FIG. 7B, which are to be inserted between the vertical reference lines V2 to V16, are produced according to the predetermined rules depicted in FIGS. 6A to 6D. As can be seen from the indices, each of the vertical reference lines has an (i+1)st position index and each of the vertical interpolation line is represented by an i-th position index, i being an odd number, e.g., 1, 3, . . . , and 15. Therefore, for instance, each of the vertical interpolation lines V3 to V15 is determined by its two neighboring vertical reference lines, e.g., V2 and V4, V4 and V6, . . . , and V14 and V16. However, since there is only one vertical reference line V2 corresponding to the vertical interpolation line V1, the vertical interpolation line V1 is determined by copying the vertical reference line V2.

The above indices assigned to the vertical interpolation and reference lines can be differently assigned thereto. That is, the vertical reference lines may be assigned by indices V1 to V15 and the vertical interpolation lines may be defined by indices V2 to V16.

The vertical interpolation lines V1 to V15 form a set of vertical interpolation lines 509 of FIG. 7B and the set is provided to the first enhancement bit calculator 310 as well as being stored at a memory (not illustrated) within the interpolation circuit 300.

To the first enhancement bit calculator 310, both the set of vertical interpolation lines 509 and the second sample block of 8×8 pixels obtained at the subtractor 220 are provided via lines L30 and L16, respectively. The first enhancement bit calculator 310 performs first enhancement layer encoding based on the set of vertical interpolation lines 509 and the second sample block to thereby provide coded first vertical enhancement layer data to the bit comparator 350 via a line L33. The first enhancement bit calculator 310, then, calculates a number of bits of the coded first vertical enhancement layer data which is coupled to the coded enhancement layer data selector 360 as first vertical bit data via a line L34. Referring to FIG. 4, there is given a detailed block diagram of the first bit calculator 310.

The first bit calculator 310 has a first and a second line analyzers 410 and 415, a segment comparator 420, a line selection circuit 440, a first and a second line refinement circuits 455 and 460, a shape reconstruction circuit 465, a subtractor 430, island coding circuit 435, a mode coding circuit 470 and a data formatting and bit calculating circuit 480.

The first line analyzer 410 analyzes the set of vertical interpolation lines inputted thereto via the line L30 to detect a number of segments within each vertical interpolation line, a length, and starting and ending points of each segment, all of which are, then, supplied to the segment comparator 420 as first sample block line analysis information. Similarly, the second line analyzer 415 analyzes the set of vertical lines of the second sample block of 8×8 pixels inputted thereto via the line L16 to detect a number of segments within each vertical line, the length and the starting and the ending points of each segment, all of which are, then, supplied to the segment comparator 420 as second sample block line analysis information.

The segment comparator 420, firstly, stores the first and second sample block line analysis information at a memory (not illustrated) included therein. Then, the segment comparator 420 compares the number of segments in each vertical interpolation line with the number of segments in each corresponding vertical line within the second sample block based on the first and the second sample block line analysis information, wherein the each corresponding vertical line in the second sample block is a vertical line located at the same position to that of the each vertical interpolation line.

And, if the number of segments in two corresponding lines, i.e., each vertical interpolation line and each corresponding vertical line are identical, first line analysis information for the vertical interpolation line and second line analysis information for the vertical line within the second sample block are both provided to the first line refinement circuit 455 via a line 43.

On the other hand, if the number of segments in two corresponding lines are not identical, then, third and fourth line analysis information for vertical lines in the second sample block located left and right hand sides of the vertical interpolation lines, respectively, are issued.

If, however, the vertical interpolation line is the leftmost vertical line within the set of vertical interpolation lines, then a line analysis information for a rightmost vertical line within a second sample block stored previously in the memory is issued as third line analysis information for the vertical line in stead of third line analysis information for the leftmost vertical line within the set of vertical interpolation lines. And the first, third and fourth line analysis information retrieved from the memory are sent to the line selection circuit 440 via a line L41.

The first line refinement circuit 455 adjusts the length of the segments in each vertical interpolation line, based on the first and second line analysis information, to be identical to the corresponding vertical line within the second sample block to thereby generate first length refinement information representing line refinement situation thereof. For example, the first line refinement circuit 455 may change the starting and the ending points of the segments in each vertical interpolation line.

Then, a first length refinement mode signal, representing whether the length of the segment has been adjusted or not, are coupled for each segment together with first length refinement information to the shape reconstruction circuit 465, the mode coding circuit 470 and the data formatting and bit calculating circuit 480 via a line L46.

The line selection circuit 440 compares the number of segments in each vertical interpolation line with those of the vertical lines on the right and left hand sides of each vertical interpolation line based on the first, third and fourth line analysis information. And in case the number of segments in a vertical interpolation line is different from both the right and the left vertical lines of the vertical interpolation line, the line selection circuit 440 selects either the right or the left vertical line in accordance with a predetermined selection rule.

Then, line analysis information for the selected vertical line and a first line selection mode signal, notifying that a vertical line has been selected based on the predetermined selection rule, are rendered to the shape reconstruction circuit 465, the mode coding circuit 470, and the data formatting and bit calculating circuit 480 via a line L44.

In case, however, the number of segments in a vertical interpolation line is identical to a vertical line on either the right or the left hand side of the vertical interpolation line, the line selection circuit 440 selects the vertical line which has the identical number of segments with the vertical interpolation line. Then, the line selection circuit 440 sends the line analysis information for the selected vertical line and a second line selection mode signal, informing which vertical line has been selected between the right and left vertical lines, to the second line refinement circuit 460 via a line L42. Furthermore, the first line analysis information is also provided to the second line refinement circuit 460 from the line selection circuit 440.

The second line refinement circuit 460, based on the line analysis information for the vertical line, the first line selection mode signal and the first line analysis information, adjusts the length of each vertical interpolation line in accordance with a method identical to that used at the first line refinement circuit 455 to thereby supply second length refinement information, a second length refinement mode signal, representing whether the length has been adjusted or not, and the second line selection mode signal to the shape reconstruction circuit 465, the mode coding circuit 470 and the data formatting and bit calculating circuit 480 via a line L45.

The shape reconstruction circuit 465 reconstructs a second sample block of 8×8 pixels to thereby form a reconstructed second sample block based on the line analysis information for the selected vertical line and the first line selection mode signal inputted thereto via the line L44, the second length refinement information and the second length refinement mode signal and the second line selection mode signal inputted thereto via the line L45, and the first length refinement information and the first length refinement mode signal inputted thereto via the line L46. The reconstructed second sample block is provided to the subtractor 430.

The subtractor 430 subtracts the reconstructed second sample block from the second sample block coupled thereto via the line L16 to produce a difference therebetween as an error data block of 8×8 pixels, which is supplied to the island coding circuit 435. The error data block is consisted of pixels of first and second binary values, e.g., 1 and 0, respectively, wherein the first binary values represent the pixels for which the results of the substraction between the BAB and the reconstructed enhancement layer block are not zero, and the second binary values represent identical pixels for which the substraction between the BAB and the reconstructed enhancement layer block result in zero value.

Figure 5D:
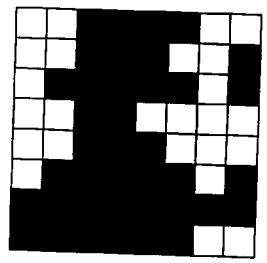
Figure 5E:
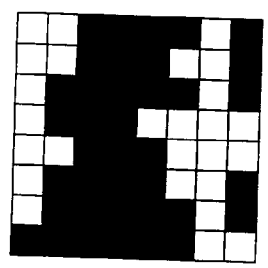
Figure 5F:
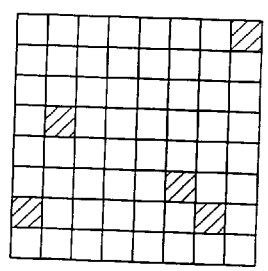
FIG. 5F portrays a error data block representing the difference between a second sample block and a reconstructed sample block both obtained in the present invention.

Referring to FIG. 5D, there is illustrated a reconstructed second sample block 511 produced at the shape reconstruction circuit 465 from the set of vertical interpolation lines 509 which are provided to the first line analyzer 410. In FIG. 5E, there is presented a second sample block 512, while in FIG. 5F, there is shown an error data block 513. The shaded parts in FIG. 5F represent the pixels in the reconstructed second sample block 511 which are not identical to those in the second sample block 512, that is, the pixels having the first binary values. On the other hand, the parts not shaded in FIG. 5F represent the pixels in the reconstructed second sample block which are identical to those in the second sample block, i.e., the pixels having the second binary values.

The island coding circuit 435 island-codes the error data block if the error data block includes more than one pixel having the first binary value, by using, for example, a reference contour based(RCB) coding method to thereby couple island-coded data or encoded error data to the data formatting and bit calculating circuit 480 via a line L49. Moreover, a first island-coding mode signal, informing whether island-coding has been performed or not, is rendered to the mode coding circuit 470. If, however, the error data block does not include pixels having the first binary value, only the first island-coding mode signal representing that island-coding has not been performed at the island coding circuit 435 is transmitted to the mode coding circuit 470 while nothing is transferred to the data formatting and bit calculating circuit 480.

Figure 8:
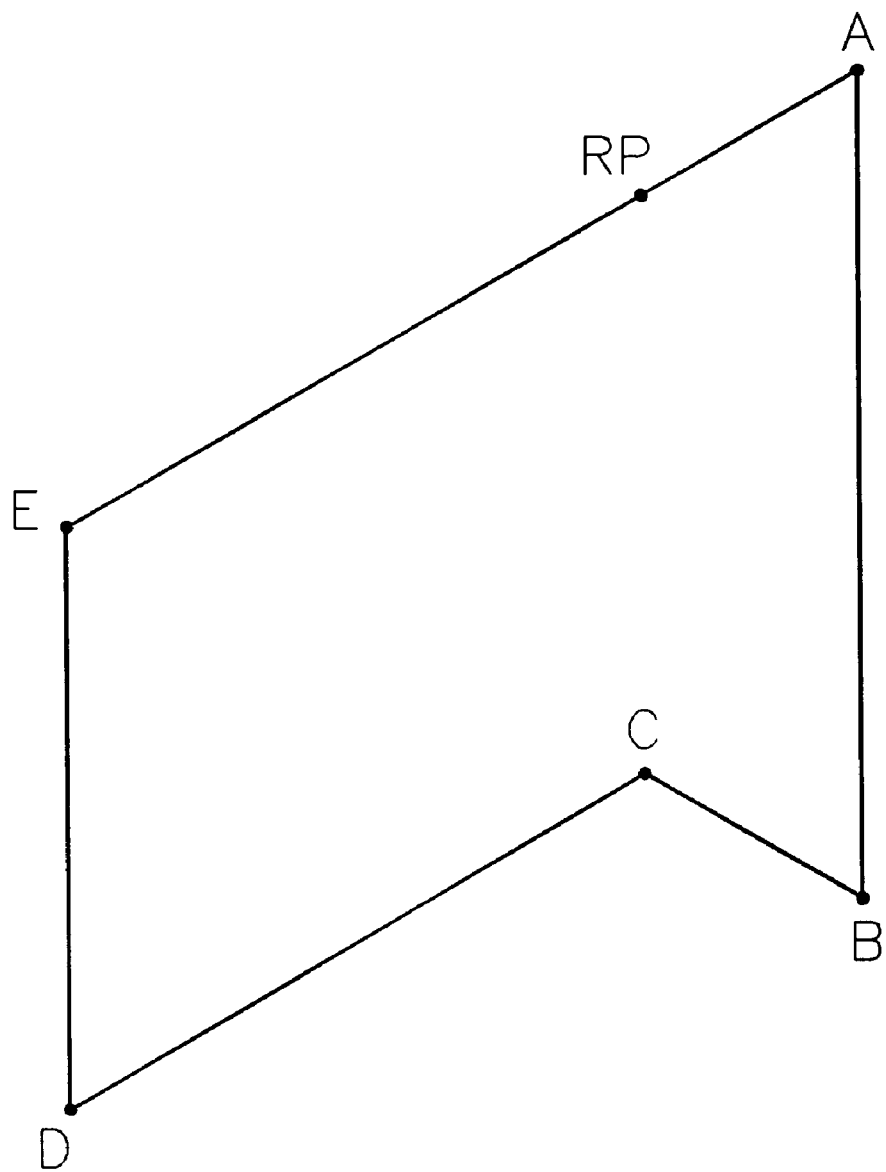
FIG. 8 pictures an example of a reference contour based (RCB) coding method utilized in the present invention.

From hereon, an encoding procedure of the error data block, employing an RCB method, is described referring to FIG. 8. Firs, the locations of the shaded parts within the error data block, representing the pixels having the first binary values, are found, which are symbolized as vertices A to E in FIG. 8. Then, a polygon consisting of segments, AB, BC, CD, DE and EA is obtained. The length of each segment is defined as a number of pixels included on each segment. Subsequently, a number of bits that can represent the longest segment is determined. When m, an integer representing the length of the longest segment, satisfies:

$$2^n \leq m < 2^{n+1}$$

the location of each vertex is coded using n bits at maximum.

More specifically, an RP(reference point) is detected by using, for example, a raster scanning method. Then, encoding is executed sequentially for each vertex proceeding, for instance, clockwise from the RP. Referring back to FIG. 8, for the vertex A, the distance between the RP and the vertex A is encoded using n bits. Similarly, for the next vertex, the distance between the vertex and a previous vertex is encoded in n bits. If the distance between a previously encoded vertex and the RP is shorter than m, a minimum number of bits to encode a current vertex is newly determined and the current vertex is encoded using the newly determined number of bits capable of representing the distance.

The mode coding circuit 470, first of all, generates an inter/intra mode signal, which shows whether the first enhancement bit calculator 310 is in an inter or an intra mode. Subsequently, the mode coding circuit 470 encodes the first line selection mode signal, the second length refinement mode signal, the first length refinement mode signal, the first island-coding mode signal and the inter/intra mode signal generated therein to thereby supply a set of encoded mode signals to the data formatting and bit calculating circuit 480 via a line L48.

The data formatting and bit calculating circuit 480 formats the above set of encoded mode signals and the first and the second length refinement information, the line island-coded data to the thereby supply first coded vertical enhancement layer data to the coded enhancement layer data selector 360 via the line L34. Furthermore, the data formatting and bit calculating circuit 480 counts a number of bits of the coded first vertical enhancement layer data to thereby couple first vertical bit data to the bit comparator 350 via the line L33.

Meanwhile, the second enhancement bit calculator 330 having the same structure as the first enhancement bit calculator 310 operates in an identical way. Thus, in case of the intra mode, the second enhancement bit calculator 330 does nothing. In case of the inter mode, to the second enhancement bit calculator 330 the second sample block and the set of vertical inserted lines are coupled via the line L16 from the subtractor 220 and the line L17 from the first line providing circuit 235, respectively.

As a result, the second enhancement bit calculator 330 provides coded second vertical enhancement layer data to the coded enhancement layer data selector 360 via a line L32. In addition to this, the second enhancement bit calculator 330 calculates and provide a number of bits of the coded second vertical enhancement layer data as second vertical bit data to the bit comparator 350 via a line L31.

In case of the intra mode, the bit comparator 350 produces a first selection signal to control the coded enhancement layer data selector 360 to select the coded first vertical enhancement layer data based on the first vertical bit data on the line L33. In case of inter mode, however, the bit comparator 350, firstly, compares the first and the second vertical bit data inputted thereto via the lines L33 and L31, respectively. Then, if the first vertical bit data is equal to or less than the second vertical bit data, the bit comparator 350 generates a second selection signal to control the coded enhancement layer data selector 360 to select the coded first vertical enhancement layer data; and if otherwise, i.e., if the first vertical bit data is greater than the second vertical bit data, the bit comparator 350 generates a third selection signal to control the coded enhancement layer data selector 360 to select the coded second vertical enhancement layer data.

The coded enhancement layer data selector 360, in response to the first selection signal, selects the coded first vertical enhancement layer data inputted thereto via the line L34 as coded vertical enhancement layer data, which is then supplied to the MUX 250 via the line L18. On the contrary, if the second and third selection signals are coupled to the coded enhancement layer data selector 360, the coded enhancement layer data selector 360 selects the first and the second vertical enhancement layer data, respectively. And the selected coded vertical enhancement data is transferred to the MUX 250 via the line L18 with a signal notifying which coded vertical enhancement layer data has been selected at the coded enhancement layer data selector 360.

In another preferred embodiment of the present invention, in addition to the functions described above, the coded enhancement layer data selector 360 calculates a selection ratio between the selected first and second coded vertical enhancement data, and supplies the selection ratio data to the second enhancement layer encoder 245 via a line L19, for example, on a frame-by-frame basis.

In accordance with the above preferred embodiment of the present invention, in case of the intra mode, the second enhancement layer encoder 245 performs horizontal enhancement layer encoding based on the first and the second blocks provided thereto via the lines L11 and L12, respectively, to thereby supply the coded horizontal enhancement layer data to the MUX 250 via the line L21. And in case of the inter mode, the second enhancement layer encoder 245 performs horizontal enhancement layer encoding based not only on the first and the second blocks provided thereto via the lines L11 and L12, respectively, but also on the set of horizontal inserted lines supplied thereto via the line L20 and the selection ratio data to thereby supply the coded horizontal enhancement layer data to the MUX 250. In the following, the functions of the second enhancement layer encoder 245 are described in more detail focusing mainly on those different from those of the first enhancement layer encoder 230.

First of all, while the base layer, the first sample block, is coupled to the interpolation circuit 300 within the first enhancement layer encoder 230 via the line L13, the first block of 8×16 pixels is provided to a interpolation circuit (not illustrated) within the second enhancement layer encoder 245 via the line L11. Moreover, while the second sample block is rendered to the first enhancement bit calculator 310 within the first enhancement layer encoder 230 via the line L16, the second block of 8×16 pixels is inputted to a first enhancement bit calculator (not shown) within the second enhancement layer encoder 245 via the line L12.

Additionally, while the set of vertical inserted lines are rendered to the second enhancement bit calculator 330 within the first enhancement layer encoder 230 via the line L17, the set of horizontal inserted lines is inputted to a second bit calculator (not illustrated) within the second enhancement layer encoder 245 via the line L20. In a preferred embodiment of the invention, unlike in the first enhancement layer encoder 230, the selection ratio data is transferred to a coded enhancement layer data selector(not illustrated) within the second enhancement layer encoder 245 from the coded enhancement layer data selector 360 within the first enhancement layer encoder 230 via the line L19.

With inputs such as above, the second enhancement layer encoder 245, in the end, provides coded horizontal enhancement layer data to the MUX 250 via the line L21. Most of the structures of the first and the second enhancement layer encoders 230 and 245 are similar, as mentioned above. The differences between the two encoders are listed below.

First, all of the lines within the base layer and the set of vertical inserted lines within the second sample block, which are inputted to the first enhancement layer encoder 230, are vertical lines. In contrast to this, all of the lines within the first block and the set of horizontal inserted lines within the second block, which are inputted to the second enhancement layer encoder 245, are horizontal lines. Therefore, all the operations carried out in the second enhancement layer encoder 245 are for horizontal lines.

For instance, the interpolation method for generating the set of vertical interpolation lines can be applied for obtaining a set of horizontal interpolation lines. The set of horizontal lines will look like the set of vertical lines, exemplified in FIG. 7A, after being rotated 90 degrees clockwise. Similarly, the set of horizontal interpolation lines will look like the set of vertical interpolation lines, shown in FIG. 7B, also after being rotated 90 degrees clockwise. The horizontal length of each horizontal line is 16 pixels.

And the coded enhancement layer data selector (not illustrated) within the second enhancement layer encoder 245, corresponding to the coded enhancement layer data selector 360 within the first enhancement layer encoder 230, has been introduced to increase the efficiency of coding by allocating different number of bits according to the selection ratio data inputted thereto via the line L19. Consequently, for example, less number of bits are assigned for coding the enhancement layer data having the greater selection ratio data between the first and the second coded enhancement layer data.

In accordance with the present invention, by implementing scalability which increases the resolution of the image gradually, the binary shape can be decoded adaptively depending on the required image resolution. Such encoding method may also reduce error and prevent or reduce the loss of bits in transmission of the image, which is necessary to obtain a higher resolution of the image.

While the present invention has been described with respect to certain preferred embodiments only, other modifications and variations may be made without departing from the spirit and scope of the present invention as set forth in the following claims.

What is claimed is:

1. A method for encoding a binary alpha block(BAB) consisting of M×N binary pixels included in a video signal, M and N each being a positive even integer, comprising the steps of:

(a) sampling every other horizontal lines of the BAB to generate a first block starting from either a first or second horizontal line of the BAB, wherein the first horizontal line is the topmost horizontal line of the BAB;

(b) sampling every other vertical lines of the first block to generate a first sample block as a base layer starting from either a first or second vertical line of the first block, wherein the first vertical line is the leftmost vertical line in the first block;

(c) encoding the first sample block to thereby produce coded base layer data; and (d) enhancement layer encoding based on the BAB, the first block and the first sample block to thereby provide coded horizontal and vertical enhancement layer data.

2. The method according to claim 1, wherein the video signal is a group of frames, each frame having a plurality of binary alpha blocks.

3. The method according to claim 1, wherein the video signal is a VOP (video object plane) having a plurality of binary alpha blocks.

4. The method according to claim 2, wherein the video signal has previous and current frames and the binary alpha block is within the current frame.

5. The method according to claim 4, wherein the step (c) includes the steps of:

encoding, in case of an intra mode, the first sample block inputted thereto by using a bit-map based shape encoding technique to thereby supply coded base layer data;

comparing, in case of an inter mode, the first sample block of the current frame with corresponding blocks of previous frames to select a most similar block of a previous frame as an estimated first sample block;

obtaining motion vector information, expressed by a two-dimensional vector having horizontal and vertical components, representing a displacement between the first sample block of the current frame and the estimated first sample block of the previous frame;

encoding error data block representing the difference between the first sample block of the current frame and the estimated first sample block of the previous frame, to thereby produce encoded error data;

combining the motion vector information and the encoded error data as coded base layer data and obtaining and then a reconstructed first sample block within the current frame based on the encoded error data and the estimated first sample block; and storing the reconstructed first sample block.

6. The method according to claim 5, wherein the step (d) includes the steps of:

(d1) subtracting the first sample block from the first block to thereby generate a second sample block;

(d2) subtracting the first block from the BAB to thereby generate a second block;

(d3) in case of the intra mode, storing the second sample block, and in case of the inter mode, not only storing the second sample block, but also retrieving a first retrieved block satisfying a first predetermined criterion among second blocks within the previous frame based on the motion vector information to provide the first retrieved block as a set of vertical inserted lines, wherein the first predetermined criterion is that a horizontal and a vertical distances between the second block and the first retrieved block are the horizontal and the vertical components of the motion vector, respectively;

(d4) in case of the intra mode, vertical enhancement layer encoding based on the first and the second sample blocks to thereby supply coded vertical enhancement layer data, and in case of the inter mode, vertical enhancement layer encoding based not only on the first and the second sample blocks but also on the set of vertical inserted lines to thereby supply coded vertical enhancement layer data;

(d5) in case of the intra mode, storing the second block, and in case of the inter mode, in addition to storing the second block, retrieving a second retrieved block satisfying a second predetermined criterion among the second blocks within the previous frame based on the motion vector information to provide the second retrieved block as a set of horizontal inserted lines, wherein the second predetermined criterion is that a horizontal and a vertical distances between the second block and the second retrieved block are two times the horizontal component of the motion vector and one time the vertical component of the motion vector, respectively; and (d6) in case of the intra mode, horizontal enhancement layer encoding based on the first and the second blocks to thereby supply coded vertical enhancement layer data, and in case of the inter mode, horizontal enhancement layer encoding based not only on the first and the second blocks but also on the set of horizontal inserted lines to thereby supply couple it with coded horizontal enhancement layer data.

7. The method according to claim 6, wherein the step (d4) has the steps of:

(d41) producing vertical interpolation lines based on the number of segments on each of vertical lines of the first sample block, positions of the segments, and the number of object pixels included in each of the segments to thereby provide a set of vertical interpolation lines, wherein each vertical line includes one or more segments and non-segments, a segment being represented by one or more successive object pixels and a non-segment being defined by one or more successive background pixels;

(d42) in the intra and the inter mode, first vertical enhancement layer encoding based on the set of vertical interpolation lines and the second sample block to thereby provide coded first vertical enhancement layer data and, at the same time, calculating and providing a number of bits of the coded first vertical enhancement layer data as first vertical bit data;

(d43) in case of the intra mode, doing nothing and in case of the inter mode, second enhancement layer encoding based on the set of vertical inserted lines and the second sample block to thereby provide coded second vertical enhancement layer data and, at the same time, calculating and providing a number of bits of the coded second vertical enhancement layer data as second vertical bit data;

(d44) in case of the intra mode, producing a first selection signal to select the coded first vertical enhancement layer data based on the first vertical bit data; and in case of the inter mode, comparing the first and the second bit data to thereby generate a second selection signal to select the coded first vertical enhancement layer data if the first vertical bit data is equal to or less than the second vertical bit data, if otherwise, to generate a third selection signal to select the coded second vertical enhancement layer data; and (d45) in case of the intra mode, in response to the first selection signal, selecting as the coded vertical enhancement layer data the coded first vertical enhancement data; in case of the inter mode, in response to the second and selection signals, selecting the first and second vertical enhancement layer data as the coded vertical enhancement layer data, respectively; providing the selected coded vertical enhancement data with a signal notifying which coded vertical enhancement layer data has been selected as coded vertical enhancement layer data; and calculating and providing a selection ratio data between the selected first and second coded vertical enhancement data.

8. The method according to claim 7, wherein the step (d41) contains the steps of:

(i1) selecting two neighboring reference lines as target lines, wherein the reference lines are vertical lines of the first sample block;

(i2) producing a vertical interpolation line based on the number of segments on each of the target lines, positions of the segments, and the number of object pixels contained in each of the segments;

(i3) repeating the steps (i1) and (i2) until all of the reference lines are processed; and (i4) supplying the vertical interpolation lines as the set of vertical interpolation lines.

9. The method according to claim 8, wherein each line in the set of vertical interpolation lines is determined as:

(p1) if the number of segments on each of the target lines is identical and there are overlapping segments on the target lines, said each of the vertical interpolation lines is generated to contain a segment determined based on positions of starting and ending points of the overlapping segments on the target lines, wherein the overlapping segments represent segments overlapped when the target lines are overlapped with each other;

(q1) if the number of segments on each of the target lines is identical and there exist non-overlapping segments on the target lines, said each of the vertical interpolation lines is produced to contain two segments generated by using the non-overlapping segments on the target lines, respectively, wherein the non-overlapping segments represent segments which do not overlap when the target lines are overlapped with each other; and (r1) if the number of segments on each of the target lines is different, said each of the vertical interpolation lines is determined by AND-operating on the segments on each of the target lines.

10. An apparatus for encoding a binary alpha block(BAB) consisting of M×N binary pixels included in a video signal, M and N each being a positive even integer, comprising:

horizontal sub-sampling means for sampling every other horizontal lines of the BAB to generate a first block starting from either a first or second horizontal line of the BAB, wherein the first horizontal line is the topmost horizontal line of the BAB;

vertical sub-sampling means for sampling every other vertical lines of the first block to generate a first sample block as a base layer starting from either a first or second vertical line of the first block, wherein the first vertical line is the leftmost vertical line in the first block;

base layer encoding means for encoding the first sample block to thereby produce coded base layer data; and enhancement layer encoding means for enhancement layer encoding based on the BAB, the first block and the first sample block to thereby provide coded horizontal and vertical enhancement layer data.

11. The apparatus according to claim 10, wherein the video signal is a set of frames, each frame having a plurality of binary alpha blocks.

12. The apparatus according to claim 10, wherein the video signal is a VOP(video object plane) having a plurality of binary alpha blocks.

13. The apparatus according to claim 11, wherein the video signal has previous and current frames and each binary alpha block is within the current frame.

14. The apparatus according to claim 13, wherein the base layer encoding means includes:

means for encoding, in case of an intra mode, the first sample block, by using a bit-map-based shape encoding technique to thereby supply coded base layer data;

means having a first frame memory for comparing, in case of an inter mode, the first sample block of the current frame with corresponding blocks of previous frames to select a most similar block of a previous frame stored within the first frame memory as an estimated first sample block;

means for obtaining motion vector information, expressed by a two-dimensional vector having horizontal and vertical components, representing a displacement between the first sample block of the current frame and the estimated first sample block of the previous frame;

means for encoding error data block representing the difference between the first sample block of the current frame and the estimated first sample block of the previous frame, to thereby produce encoded error data;

means for combining the motion vector information and the encoded error data as coded base layer data and then obtaining a reconstructed first sample block within the current frame based on the encoded error data and the estimated first sample block; and means for storing the reconstructed first sample block at a location within the first frame memory.

15. The apparatus according to claim 14, wherein the enhancement layer encoding means includes:

means for subtracting the first sample block from the first block to thereby generate a second sample block;

means for subtracting the first block from the BAB to thereby generate a second block;

vertical line providing means having a second frame memory therein, in case of the intra mode, storing the second sample block in the second frame memory; and in case of the inter mode, not only storing the second sample block, but also retrieving a first retrieved block satisfying a first predetermined criterion among second blocks within the previous frame stored in the second frame memory based on the motion vector information to provide the first retrieved block as a set of vertical inserted lines, wherein the first predetermined criterion is that a horizontal and a vertical distances between the second block and the retrieved block are the horizontal and the vertical components of the motion vector, respectively;

first enhancement layer encoding means for, in case of the intra mode, vertical enhancement layer encoding based on the first and the second sample blocks to thereby supply coded vertical enhancement layer data, and in case of the inter mode, vertical enhancement layer encoding based not only on the first and the second sample blocks but also on the set of vertical inserted lines to thereby supply coded vertical enhancement layer data;

vertical line providing means having a third frame memory therein, in case of the intra mode, storing the second block in the third frame memory, and in case of the inter mode, not only storing the second block, but also retrieving a second retrieved block satisfying a second predetermined criterion among second blocks within the previous frame stored in the third frame memory, based on the motion vector information, to provide the second retrieved block as a set of horizontal inserted lines, wherein the second predetermined criterion is that a horizontal and a vertical distances between the second block and the second retrieved block are two times the horizontal component and one time the vertical component of the motion vector, respectively; and second enhancement layer encoding means for, in case of the intra mode, horizontal enhancement layer encoding based on the first and the second blocks to thereby supply coded vertical enhancement layer data, and in case of the inter mode, horizontal enhancement layer encoding based on the first and the second sample blocks and the set of horizontal inserted lines to thereby supply coded horizontal enhancement layer data.

16. The apparatus according to claim 15, wherein the first enhancement layer encoding means has:

vertical interpolation means for producing a set of vertical interpolation lines in accordance with a predetermined interpolation method;

first vertical enhancement bit data calculating means for, in the intra and the inter mode, first vertical enhancement layer encoding based on the set of vertical interpolation lines and the second sample block to thereby provide coded first vertical enhancement layer data and, at the same time, calculating and providing a number of bits of the coded first vertical enhancement layer data as first vertical bit data;

second vertical enhancement bit calculating means for, in case of the intra mode, doing nothing and in case of the inter mode, second enhancement layer encoding based on the set of vertical inserted lines and the second sample block to thereby provide coded second vertical enhancement layer data and, at the same time, calculating and providing a number of bits of the coded second vertical enhancement layer data as second vertical bit data;

vertical bit comparison means for, in case of the intra mode, producing a first selection signal to select the coded first vertical enhancement layer data based on the first vertical bit data; and in case of the inter mode, comparing the first and the second bit data to thereby generate a second selection signal to select the coded first vertical enhancement layer data if the first vertical bit data is equal to or less than the second vertical bit data and, if otherwise, to generate a third selection signal to select the coded second vertical enhancement layer data; and first coded enhancement layer selection means for, in case of the intra mode, in response to the first selection signal, selecting the coded first vertical enhancement data as coded vertical enhancement layer data; in case of the inter mode, in response to the second and the third selection signals, selecting the first and the second vertical enhancement layer data as coded vertical enhancement layer data, respectively; providing the selected coded vertical enhancement data with a signal notifying which coded vertical enhancement layer data has been selected as coded vertical enhancement layer data; and calculating and providing a selection ratio data between the selected first and second coded vertical enhancement data.

17. The apparatus according to claim 16, wherein the second enhancement layer encoding means has:

horizontal interpolation means for producing horizontal interpolation lines in accordance with a predetermined interpolation method;

first horizontal enhancement bit calculating means for, in the intra and the inter mode, first horizontal enhancement encoding based on the set of horizontal interpolation lines and the second block to thereby provide coded first horizontal enhancement layer data and, at the same time, calculating and providing a number of bits of the coded first horizontal enhancement layer data as first horizontal bit data;

second horizontal enhancement bit calculating means for, in case of the inter mode, doing nothing and in case of the inter mode, second enhancement layer encoding based on the set of horizontal inserted lines and the second block to thereby provide coded second horizontal enhancement layer data and, at the same time, calculating and providing a number of bits of the coded second horizontal enhancement layer data as second horizontal bit data;

horizontal bit comparison means for, in case of the intra mode, producing a first choice signal to choose the coded first horizontal enhancement layer data based on the first horizontal bit data; and in case of the inter mode, comparing the first and second bit data to thereby generate a second choice signal to choose the coded first horizontal enhancement layer data if the first horizontal bit data is equal to or less than the second horizontal bit data and, if otherwise, to generate a third choice signal to choose the coded second horizontal enhancement layer data; and second coded enhancement layer data selection means for, in case of the intra mode, in response the first choice signal, choosing the coded first horizontal enhancement data as coded horizontal enhancement layer data; in case of the inter mode, in response to the second and third choice signals, choosing the first and the second horizontal enhancement layer data as the coded horizontal enhancement layer data, respectively; and providing the chose coded horizontal enhancement data with a mode signal notifying which coded horizontal enhancement layer data has been chosen as the coded horizontal enhancement layer data.

18. The apparatus according to claim 17, wherein the first vertical enhancement bit calculating means contains:

first line analyzing means for analyzing the set of vertical interpolation lines to thereby detect and supply a number of segments within each vertical interpolation line, a length and starting and ending points of each segment as first sample block line analysis information;

second line analyzing means for analyzing the set of vertical lines of the second sample block to thereby detect and supply a number of segments within each vertical line, a length and starting and ending points of each segment as second sample block line analysis information;

segment comparison means having a fourth memory therein: first, storing the first and the second sample block line analysis information at the fourth memory; comparing the number of segments in each vertical interpolation line with the number of segments in each corresponding vertical line within the second sample block based on the first and the second sample block line analysis information; if the number of segments in two corresponding lines are identical, supplying first line analysis information for the vertical interpolation line and second line analysis information for the vertical line within the second sample block; if the number of segments are not identical, issuing third and fourth line analysis information for vertical lines in the second sample block located left and right hand sides of the vertical interpolation line, respectively, wherein when the vertical interpolation line is the leftmost one within the set, then a rightmost vertical line within a second sample block stored previously in the memory is issued as third line analysis information for the vertical line in stead of third line analysis information for the leftmost vertical line within the set of vertical interpolation lines; and providing the first, third and fourth line analysis information;

first line refinement means for adjusting the length of the segment in each vertical interpolation line based on the first and the second line analysis information to be identical to the corresponding vertical line within the second sample block to thereby generate first length refinement information representing line refinement situation thereof and first length refinement mode signal representing whether the length of the segment has been adjusted or not for each segment;

line selection means for, first, comparing the number of segments in each vertical interpolation line with those of the vertical lines on the right and left hand sides of each interpolation line based on the first, third and fourth line analysis information; in case the number of segments in a vertical interpolation line is different from both the right and the left hand sides vertical lines of the vertical interpolation line, selecting either the right or left hand side vertical line in accordance with a predetermined selection rule; rendering the line analysis information for the selected vertical line and a first line selection mode signal, notifying that a vertical line has been selected based on the predetermined selection rule; and in case, however, the number of segments in a vertical interpolation line is identical to a vertical line on either the right or the left hand side of the vertical interpolation line, selecting the vertical line which has the identical number of segments with the vertical interpolation line and sending the line analysis information of the selected vertical line and a second line selection mode signal, informing which vertical line has been selected among the right and the left hand sides vertical lines together with the first line analysis information;

second line refinement means for adjusting the length of each vertical interpolation line in accordance with a method identical to that used in the first line refinement means based on the line analysis information of the selected vertical line, the first line selection mode signal and the first line analysis information to thereby provide second length refinement information and a second length refinement mode signal representing whether the length has been adjusted or not;

shape reconstruction means for reconstructing the second sample block to form a reconstructed second sample block based on the line analysis information for the selected vertical line, the first line selection mode signal, the second line selection mode signal, the second length refinement information, the second length refinement mode signal, the first length refinement information and the first length refinement mode signal inputted to thereby provide a reconstructed second sample block;

means for subtracting the reconstructed second sample block from the second sample block to produce the difference therebetween as error data block that includes pixels of first and second binary values, wherein the first binary values represent the pixels whose values in the reconstructed second sample block are not identical to those in the second sample block, and the second binary values represent identical pixels whose values in the reconstructed second sample block are identical to those in the second sample block;

means for island-coding the error data block if the error block includes more than one pixel having the first binary value to thereby provide island-coded data as encoded error data and a first island-coding mode signal, informing whether island-coding has been performed or not; and if the error data block does not include pixels having the first binary value, providing only the first island-coding mode signal representing that island-coding has not been performed;

mode coding means for generating an inter/intra mode signal, which shows whether the first enhancement bit calculating means is in the inter mode or in the intra mode; encoding the first line selection mode signal, the second length refinement mode signal, the first length refinement mode signal, the first island-coding mode signal, and the inter/intra mode signal generated therein to thereby supply a set of encoded mode signals; and data formatting and bit calculating means for formatting the set of encoded mode signals and the first and the second length refinement information, the line analysis information for the selected vertical line, and the island-coded data to thereby supply the first coded vertical enhancement layer data; and counting a number of bits of the coded first vertical enhancement layer data to couple the first vertical bit data.

19. The apparatus according to claim 18, wherein both of M and N are 16.

* * * * *